United States Patent [19]

Riedel

[11] 4,090,728
[45] May 23, 1978

[54] BUMPER ARRANGEMENT

[75] Inventor: Wolfgang Riedel, Braunschweig, Germany

[73] Assignee: Volkswagenwerk Aktiengesellschaft, Germany

[21] Appl. No.: 779,731

[22] Filed: Mar. 21, 1977

[30] Foreign Application Priority Data

Apr. 10, 1976 Germany .............................. 2615747

[51] Int. Cl.² .............................................. B60R 19/08
[52] U.S. Cl. .................................................. 293/71 R
[58] Field of Search ...................... 293/70, 71 R, 71 P, 293/72, 88; 114/219

[56] References Cited

U.S. PATENT DOCUMENTS

| 3,638,985 | 2/1972 | Barton et al. | 293/71 R |
| 3,843,182 | 10/1974 | Walls et al. | 293/72 |
| 3,902,748 | 9/1975 | Bank et al. | 293/71 P |
| 3,938,841 | 2/1976 | Glance et al. | 293/71 R |
| 4,030,735 | 6/1977 | Jacob et al. | 293/71 R |

FOREIGN PATENT DOCUMENTS

| 2,303,778 | 9/1973 | Germany | 293/71 P |
| 2,433,138 | 7/1974 | Germany | 293/71 R |
| 2,457,404 | 10/1975 | Germany | 293/71 P |

Primary Examiner—Trygve M. Blix
Assistant Examiner—Stuart M. Goldstein
Attorney, Agent, or Firm—Brumbaugh, Graves, Donohue & Raymond

[57] ABSTRACT

A bumper for an object to be protected, such as an automobile, has a closed profile-section support element comprised of a rigid rear support and a front hollow section made of deformable material. The front section has two freely extending shank portions that are separably connected with the rigid support. The front section contains reenforcing ribs extending between the shank portions with their free edges arranged opposite, and at least approximately parallel to the front portion of the rigid support. In order to equalize tensile stresses and prevent tearing of the reenforcing ribs on impact, at least some of these ribs are provided with a semi-circular recess in the mid-zone of their free edges.

1 Claim, 2 Drawing Figures

BUMPER ARRANGEMENT

BACKGROUND OF THE INVENTION

The present invention relates to bumpers and, more particularly, to bumpers comprised of a rigid rear support and a deformable front hollow section with freely extending parallel shank portions fixed on the rigid support. Reenforcing ribs extend between the shanks with their free edges arranged opposite, and at least approximately parallel to the front portion of the rigid support.

Bumpers of this kind, which may be used for motor vehicles and also for the protection of stationary objects, as on bumping posts or the like, are disclosed, for example, in the German patent publication (Offenlegungsschrift) No. 2,433,138. These bumpers operate in such a way that, relatively shortly after the commencement of an impact, the free edges of the reenforcing ribs come to bear against the front surface of the rigid support, thereby essentially determining the bumper's energy absorbing characteristic. The wall thickness of the reenforcing ribs is therefore one of the factors affecting this energy absorbing characteristic.

Because the shank portions of the deformable front hollow section are fixed on the rigid support, these portions have a tendency to bend outwardly on impact, producing tensile stresses within the material of the reenforcing ribs. As tests have shown, these tensile stresses may cause cracks to form in the reenforcing ribs in the transition region where the free edges of the reenforcing ribs extend into the shank portions of the deformable front hollow section.

It is an object of the present invention to provide a bumper of the type described above in which the aforementioned phenomenom of crack formation is substantially reduced without changing or impairing the bumper's energy absorbing characteristics.

It is an object of the present invention to provide a bumper of the type described above in which crack formation is substantially reduced without any increase in the wall thickness of the reenforcing ribs.

SUMMARY OF THE INVENTION

These objects, as well as other objects which will become apparent in a discussion that follows, are achieved, according to the present invention, by providing a semicircular recess in the mid-zone of the free edges of at least some of the reenforcing ribs.

Accordingly, the present invention is based on the discovery that a recess of this shape in the mid-zone of the free edge of a reenforcing rib effects an equalization of the tensile stresses in the rib cross-section, thereby reducing the tensile stress in the regions adjacent the shank portions of the hollow section where the rib has a tendency to crack. By locating the recess in the mid-zone of the edge—that is, in the case of a horizontally extending bumper, at mid-height between the two shank portions of the hollow profile section—the recess is effective to equalize the tensile stresses no matter what the direction or location of the impact force may be on the bumper.

For a better understanding of the present invention, together with other and further objects, reference is made to the following description, taken in conjunction with the accompanying drawing, and its scope will be pointed out in the appended claim.

DESCRIPTION OF THE PREFERRED EMBODIMENT

Figure 1:
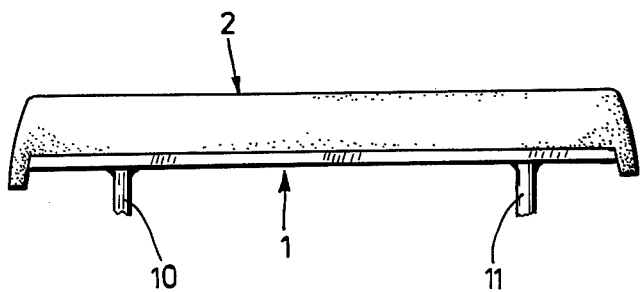
FIG. 1 is a diagrammatic plan view of a bumper of the type to which the present invention relates.

As shown in FIG. 1, the main components of the bumper in accordance with the invention are a rigid support means 1 — which may, for example, be a component of a motor vehicle or attached to the vehicle by bumper shanks 10 and 11 — and a hollow section 2 made of some deformable material such as rubber. The hollow section 2 comprises two flanges or shank portions 3 and 4 having free end regions which are fixed to the rigid support 1 in a manner known in the art. Extending between the facing sides of the shank portions 3 and 4 are vertical reinforcing ribs 5 of which only one is visible in FIG. 2. As shown, the ribs are provided with a free edge 6 extending for the most part substantially parallel to the front surface of the rigid support 1. This edge 6 extends contiguously into the material of the shank portions 3 and 4 with rounded points of transition 7 and 8.

Figure 2:
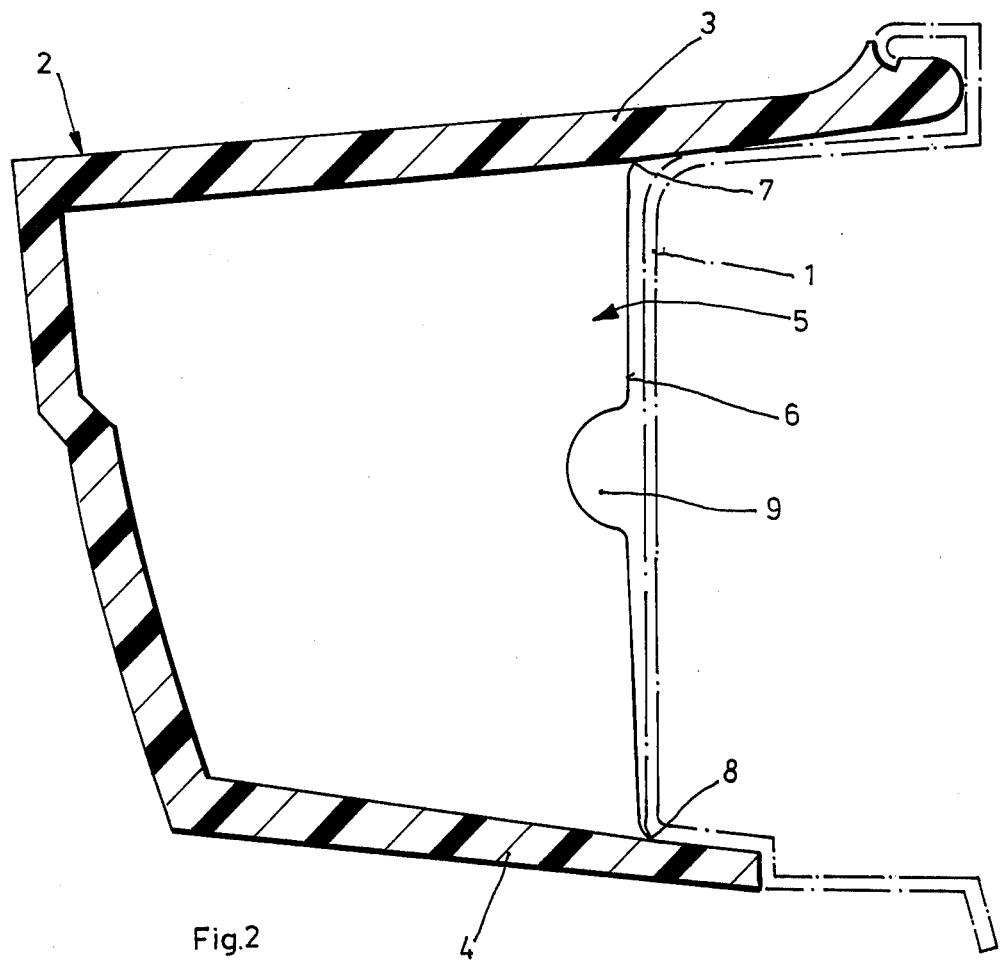
FIG. 2 is a cross-sectional view of the bumper of FIG. 1 showing a reenforcing rib with a recess in accordance with the present invention.

It has been found that cracks may form at the points of transition 7 and 8 due to the high tensile stresses in the edge regions 6 occurring on impact. In order to equalize the forces which would otherwise appear at various horizontal sections through the reenforcing ribs 5 and thereby to decrease the stresses in the free edge regions of the ribs, a semi-circular recess 9 is provided in at least some of the ribs approximately at mid-height between the two shank portions 3 and 4. As is illustrated in FIG. 2, the recess 9 makes a smooth, rounded transition into the remaining portions of the edge 6 which extend substantially parallel to the front surface of the rigid support 1. Thus, even with the recess, the edge 6 of each rib bears against the front surface of the support 1 relatively shortly after commencement of an impact.

Due to its position at mid-height, or in the mid-zone of the free edge 6, the recess 9 prevents the formation of cracks in both transition zones 7 and 8, regardless of whether, during an impact, the impinging object initially contacts the bumper in the region of the upper or lower front edge of the hollow profile 2.

It will be understood that the above-described embodiment is merely exemplary and that persons skilled in the art may make many variations and modifications thereto without departing from the spirit and scope of the invention. All such variations and modifications are intended to be included within the scope of the invention as defined in the appended claim.

I claim:

1. A bumper for an object to be protected, such as a motor vehicle, with a closed profile-section support means comprised of a rigid rear support means and a front hollow section made of deformable material, said hollow section being fixed on the rigid support means with two freely extending shank portions of said hollow section, said hollow section containing reinforcing ribs each having a linearly extending free edge and each extending between said shank portions with said free edge arranged opposite and at least approximately parallel to the front portion of said rigid support means for supporting said hollow section on impact, the improvement wherein at least some of said reinforcing ribs have a single semi-circular recess, the recess being located in the mid-zone of said free edges for relieving tensile forces at both ends of said edges, said recesses having a diameter which is substantially smaller than the length of said edges.

* * * * *